No. 665,934. Patented Jan. 15, 1901.
W. H. ROE.
CORN HARVESTER.
(Application filed Feb. 14, 1900.)
(No Model.) 5 Sheets—Sheet 1.
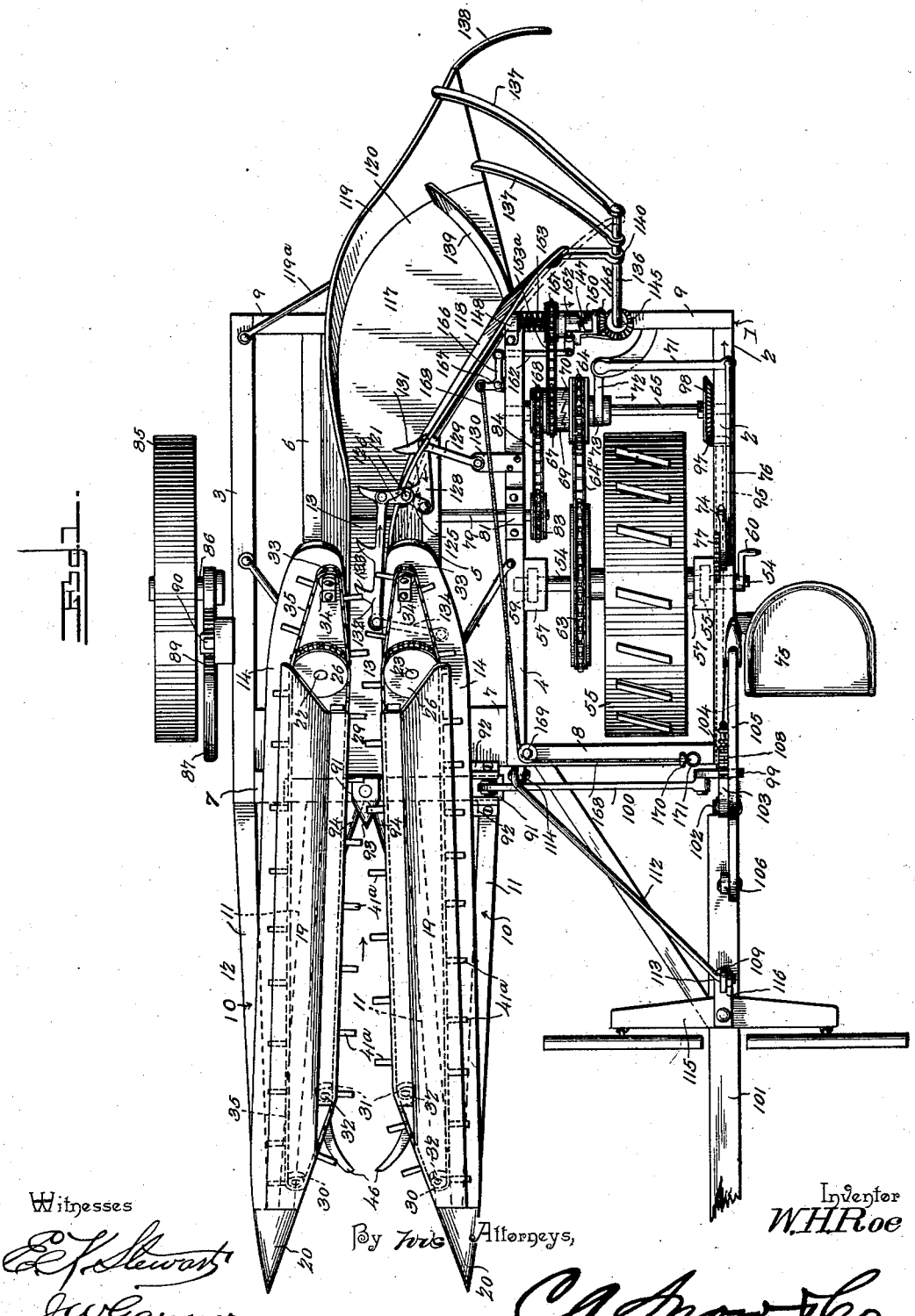
Witnesses
Inventor
W. H. Roe
By his Attorneys,

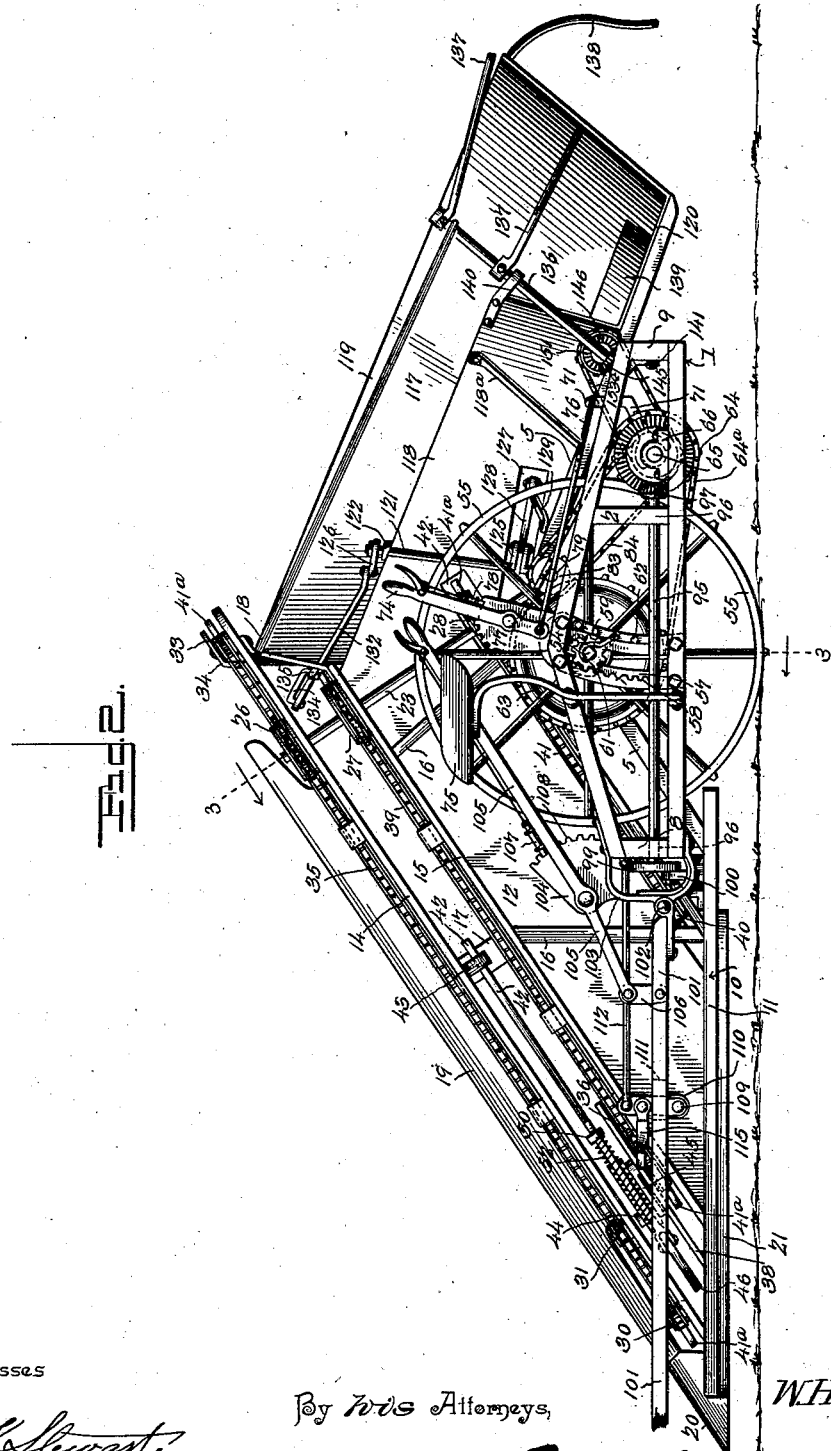

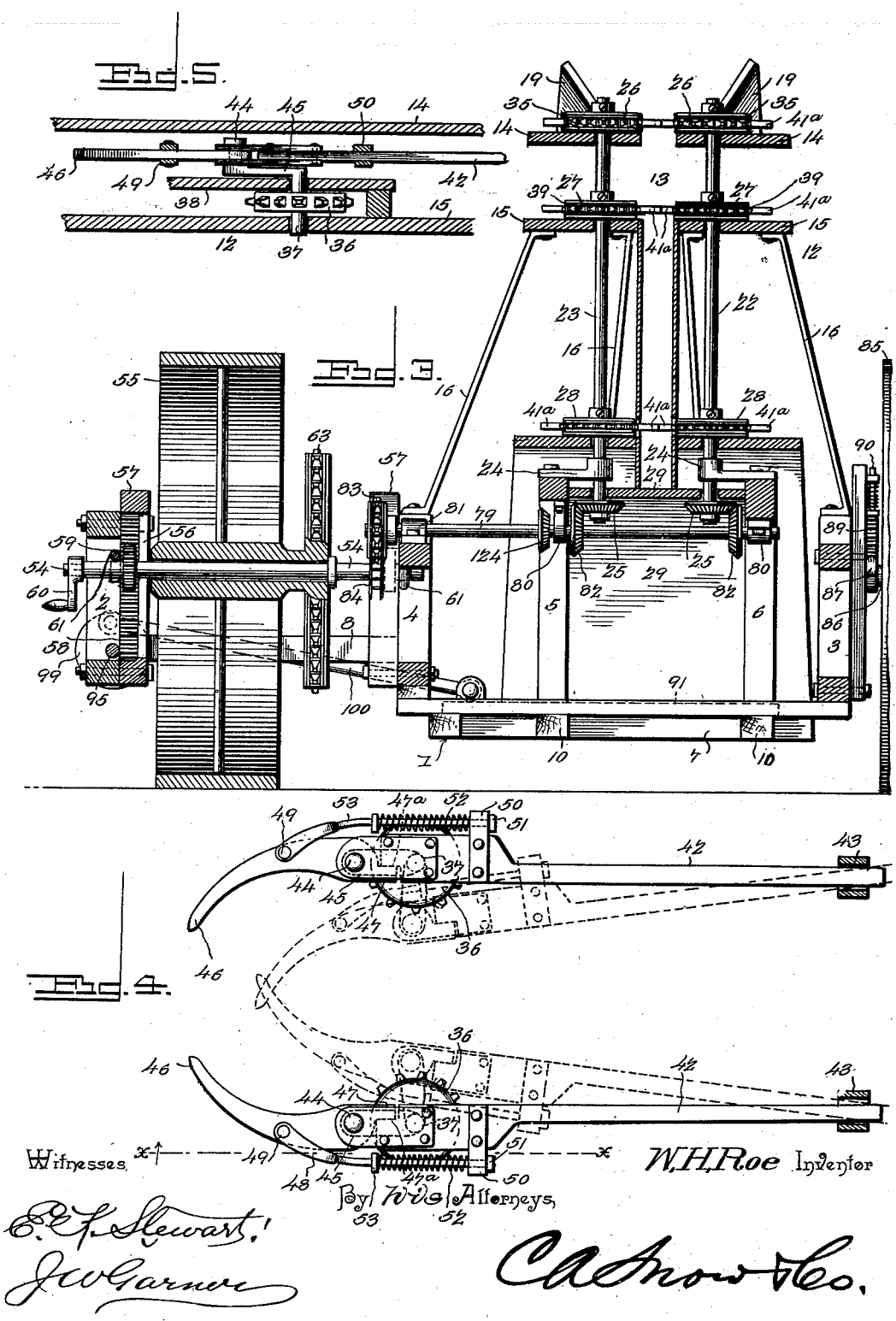

No. 665,934. Patented Jan. 15, 1901.
W. H. ROE.
CORN HARVESTER.
(Application filed Feb. 14, 1900.)
(No Model.) 5 Sheets—Sheet 4.
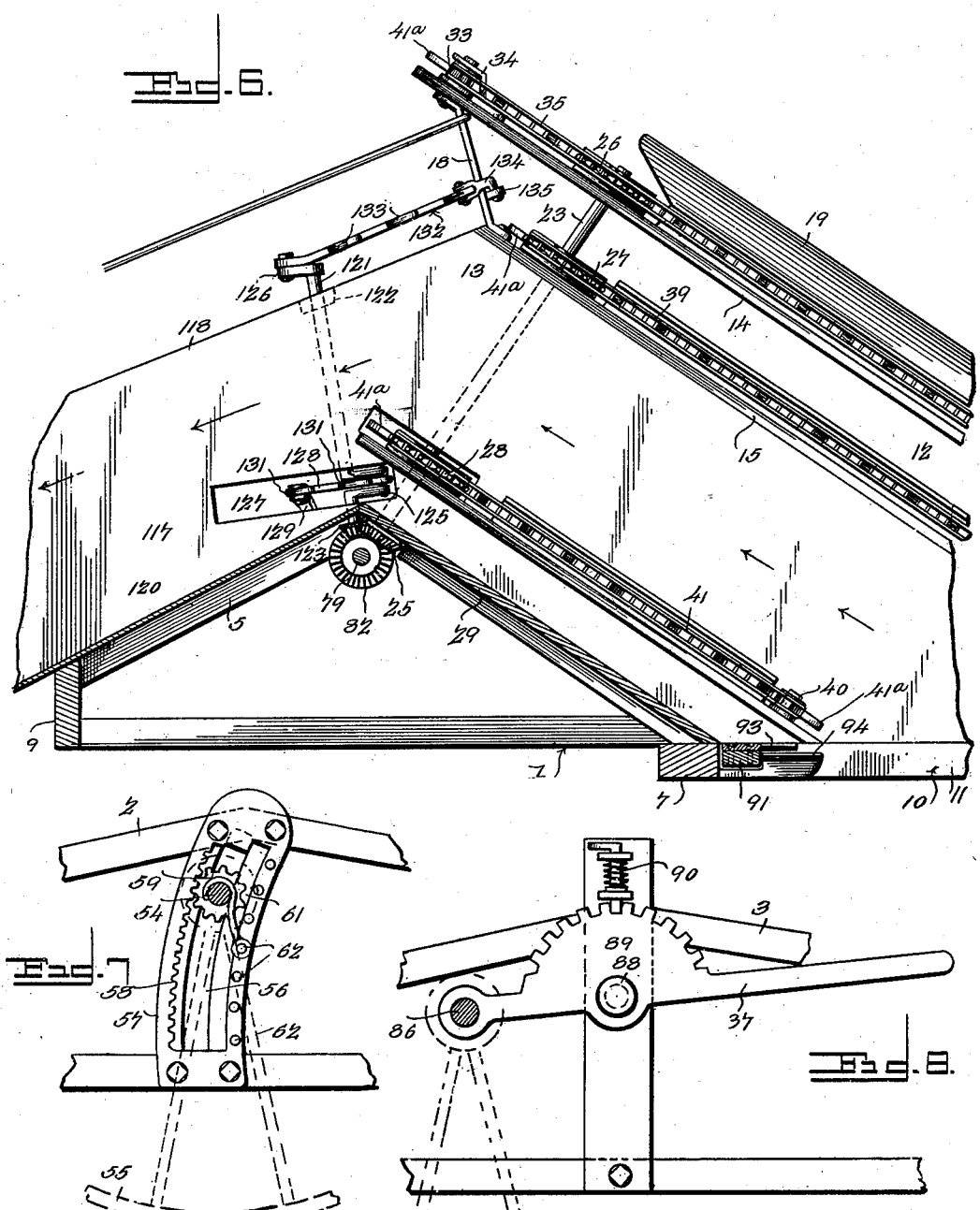
Witnesses
E. F. Stewart
J. W. Garner
W. H. Roe Inventor
By his Attorneys,
C. A. Snow & Co.

No. 665,934. Patented Jan. 15, 1901.
W. H. ROE.
CORN HARVESTER.
(Application filed Feb. 14, 1900.)
(No Model.) 5 Sheets—Sheet 5.
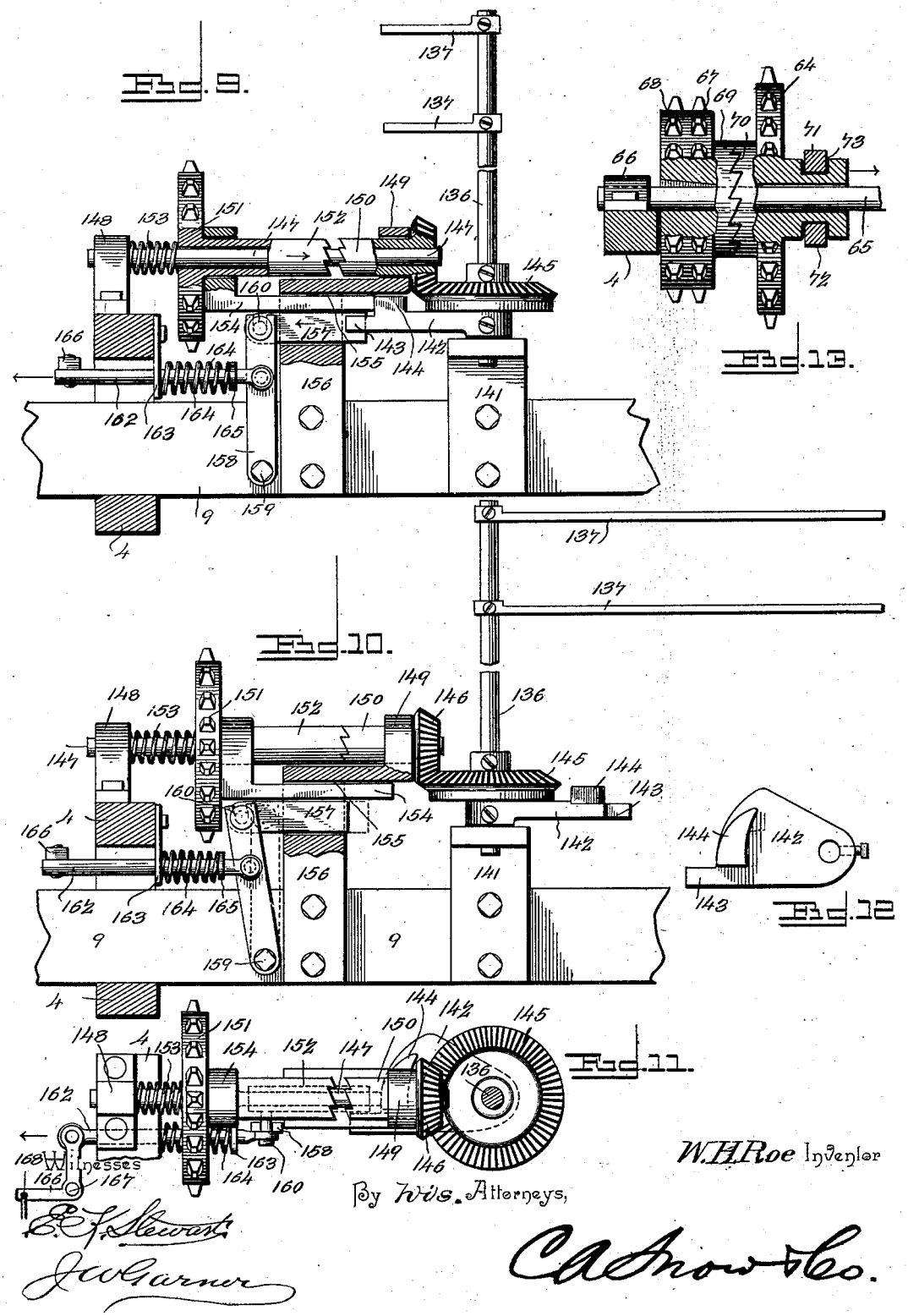
W. H. Roe Inventor

UNITED STATES PATENT OFFICE.

WILLIAM H. ROE, OF SKIPTON, MARYLAND.

CORN-HARVESTER.

SPECIFICATION forming part of Letters Patent No. 665,934, dated January 15, 1901.

Application filed February 14, 1900. Serial No. 5,173. (No model.)

*To all whom it may concern:*

Be it known that I, WILLIAM H. ROE, a citizen of the United States, residing at Skipton, in the county of Talbot and State of Maryland, have invented a new and useful Corn-Harvester, of which the following is a specification.

My invention is an improved corn-harvester of the class adapted for cutting standing corn in the field and depositing the same in rows to be shocked.

An object of my invention is to provide novel gathering devices for operating upon bent and fallen corn and feeding the same to the cutting and conveying mechanisms.

A further object of my invention is to provide means whereby such gathering devices will be preserved from breaking when encountering bushes and other obstructions in the field.

A further object of my invention is to provide a novel throat feed mechanism in the conveyer for forcing the cornstalks from the conveyer to the carrier.

A further object of my invention is to provide novel mechanism for discharging the corn from the carrier and for automatically locking the sweep-arms at the rear of the carrier.

With these and other objects in view my invention consists in the peculiar construction and combination of devices hereinafter fully set forth, and particularly pointed out in the claims.

In the accompanying drawings, Figure 1 is a top plan view of a corn-harvesting machine constructed in accordance with my invention. Fig. 2 is a side elevation of the same. Fig. 3 is a transverse sectional view of the same, taken on the line *a a* of Fig. 2. Fig. 4 is a detail top plan view of the gathering devices at the front end of the conveyer. Fig. 5 is a detail sectional view of the same, taken on the line *x x* of Fig. 4. Fig. 6 is a detail vertical sectional view through the center of the conveyer and illustrating a portion of the conveyer, the front portion of the rearwardly-inclined carrier, the throat feeding mechanism, and the cutting mechanism. Fig. 7 is a detail view illustrating the devices for attaching the shaft of the driving traction-wheel to the machine-frame and permitting the vertical adjustment of said shaft therein. Fig. 8 is a similar view illustrating means for connecting the supporting-wheel to the machine-frame and adapting said supporting-wheel to be vertically adjusted with relation to the machine-frame. Fig. 9 is a detail view, partly in elevation and partly in section, of the mechanism for controlling and operating the sweep-arms, which permit the accumulation of corn in the carrier and the discharge thereof from the carrier, the driving sprocket-wheel being shown unclutched. Fig. 10 is a similar view of the same, showing the driving sprocket-wheel clutched with the gear for operating the sweep-arms. Fig. 11 is a detail top plan view of the same, the arm-shaft being in section and the parts being in the relative positions shown in Fig. 9. Fig. 12 is a detail top plan view of the detent-plate, showing the locking-arm and operating-cam thereof. Fig. 13 is a detail view of a portion of the driving counter-shaft and the sprocket-wheel and clutch thereon.

The main supporting-frame 1 of my improved corn-harvesting machine is substantially square in plan. On the draft side of the frame is a beam or truss 2. On the opposite side thereof is a similar beam or truss 3. A beam or truss 4 is parallel with the trusses 2 3 and at a suitable distance from the former. In the space between the trusses 3 4 are disposed a pair of angle-beams or trusses 5 6, which are a suitable distance apart and are substantially constructed, as shown in Fig. 6. A transversely-disposed front bar 7 connects the front ends of the trusses 3 4 and of the angle-beams 5 6. The front ends of the trusses 2 4 are connected together by a cross-beam 8. A transverse bar or beam 9 at the rear side of the frame connects the rear ends of the trusses 2 3 4 and the rear ends of the angle-beams 5 6 together. From the front side of the cross-beam 7 project two truss-frames 10, each of which is composed of a pair of rearward-diverging bars 11, which meet at their front ends. The said truss-frames 10 support the front ends of the conveyer-frames 12. The conveyer-frames, as shown in Fig. 1, are arranged in opposing relation to each other and converge toward their rear ends to form a contracted throat 13. Each conveyer-frame comprises, essentially, a pair of forwardly-inclined parallel boards 14 15, disposed one above the other, as shown, suitable brace-bars 16 for the lower board 15, and connecting brace-irons 17 18 between said boards 14 15 to connect the latter together in pairs, as shown. The front ends of the boards 14 15 are secured on the front ends of the angle truss-frames 10. On the upper sides of the boards 14 are wing-boards 19, the latter being obliquely disposed with relation to the boards 14, as clearly shown in Fig. 3. The front ends of said wing-boards are secured to shoes 20, which are pointed in form, as shown in Figs. 1 and 2, and are attached to and firmly secured on the front ends of the truss-frames 10. The said shoes are preferably provided with rearwardly-extending arms 21, which are bolted to the under side of the angled truss-frames 10 and serve to strengthen said truss-frames. Operating-shafts 22 23 are disposed, respectively, near the rear ends of the conveyer-frames, said shafts being at substantially right angles to the boards 14 15 and having bearings therein, the lower portions of said shafts having bearings in bracket-arms 24, which are bolted on the upper sides of the angled beams 5 6, near the apexes thereof, and having beveled gears 25 fast to their lower ends. On each shaft 22 23, at the upper end thereof and above the boards 14, is secured a sprocket carrier-wheel 26. Similar wheels 27 are secured to said shafts above the board 15, and similar wheels 28 are secured to said shafts just above the lower sides of the carrier-frame. Bottom boards 29 connect the lower sides of the conveyer-frames together, said bottom boards extending from the cross-beam 7 to the rear ends of the conveyer-frames, as shown in Fig. 6, and serving to support the butts of the cornstalks after the same have been cut by the cutting mechanism, which is arranged and supported on the said cross-beam 7 and will be hereinafter described. Chain-sheaves 30 31 are journaled at and near the front ends of the boards 14 and are arranged above said boards, as shown, and adapted to rotate on suitable fixed spindles 32. Near the rear ends of the said boards 14 are guiding-sheaves 33, which are arranged on said boards and journaled in suitable brackets 34, as shown. Endless conveyer-chains 35 connect the sheaves 30, 31, and 33 and are operated by the sprocket-wheels 26. Sprocket-wheels 36 are secured on short crank-shafts 37, which crank-shafts have their bearings in the boards 15, near the lower front ends thereof, and in boards 38, which are supported parallel with said boards 15 at their front ends and between said boards 15 and the boards 14. The said sprocket-wheels 36 are connected to the sprocket-wheels 27 by endless conveyer-chains 39. At the lower sides of the conveyer-frames, slightly in advance of and above the cutter mechanism, are journaled chain-sheaves 40, which are connected to the sprocket-wheels 28 by the endless conveyer-chains 41. The said conveyer-chains 35, 39, and 41 are provided with projecting spurs 41ª, which are adapted to engage the corn between the opposing leads of the said endless conveyer-chains and to cause the cornstalks to be conveyed rearwardly by the said conveyer-chains in the direction indicated by the arrow in Fig. 1, said conveyer-chains being actuated by the rotation of the shafts 22 23, which derive their power from means hereinafter described.

I will now describe my novel gathering mechanisms disposed at the front portions of the conveyer-frames and which coöperate with the endless conveyer-chains and serve to engage cornstalks which are fallen or inclined nearly to the ground and raise the same to the conveying-chains, so that they will be engaged therewith, applied to the cutting mechanism, and harvested.

Arms 42 have their rear ends carried and guided in ways 43 under the boards 14. Said arms are of suitable length and are pivoted at their front ends on the wrists 44 of the cranks 45, which cranks are rotated by the shafts 37. Reciprocating rotary motion is hence communicated to the front ends of the said arms 42, which operate in unison, and each of said arms 42 is provided at its front end with a gathering-finger 46 of substantially sickle shape. The said gathering-fingers are disposed and operate at the front ends of the conveyer-frames and within a few inches of the ground, and hence are adapted as the machine is driven across a field and directed so that the conveyer-frames are on opposite sides of a row of corn to gather the cornstalks which may be inclined in the field and to raise the same, so that said cornstalks will be engaged by the spurs of the endless conveyer-chains, and hence carried rearwardly between the conveyer-frames and harvested, together with the erect standing cornstalks. To preserve said gathering-fingers from becoming broken when they encounter obstructions, such as bushes in the field, the same are formed separably from the arms 42 and are hinged thereto, being pivoted upon the wrists 44 of the cranks. Said gathering-fingers have engaging shoulders 47 in rear of their pivots, which are adapted to engage suitable recesses 47ª, with which the front ends of the arms 42 are provided, and to normally preserve said gathering-fingers in the operative relation to the said arms 42, (shown in Fig. 4;) but said gathering-fingers by being thus pivotally connected or hinged to the front ends of the arms 42 are adapted to swing outward from said arms when they encounter unyielding obstructions, and thus are preserved from breaking. Rods 48 are pivoted at their front ends to the gathering-fingers, as at 49, and the rear ends of said rods operate in supporting-brackets 50, which project from the outer sides of the arms 42. The rear ends of said rods are provided with caps or enlarged heads 51, which by engagement with the rear sides of the brackets 50 limit the forward movements of said rods, and on the latter are tension-springs 52, which bear between the front sides of the bracket 50 and shoulders 53 on said rods, the function of the said springs being to preserve the gathering-fingers in their normal operative position with relation to the arms 42 and to permit said gathering-fingers to turn outward on their pivots when they encounter unyielding obstructions, for the purpose hereinbefore stated.

The axle 54, on which the traction-wheel 55 revolves, passes through curved slots 56 in plates 57, which connect the upper and lower central portions of the trusses 2 4. Said plates are each provided on one side of the curved slot 56 with a segmental rack 58, which is concentric with the proximate slot, and the axle 54 is provided with spur-pinions 59, which engage said slots, and hence adapt the axle to be raised and lowered in the plates by rotating said axle, which may be accomplished by means of the hand-crank, as at 60. Supporting-hooks 61 are adapted to be secured to the plate 57 at any desired adjustment by means of a series of openings 62, with which said plates are provided on the sides opposite the segmental racks thereof, and said hooks when thus adjusted are adapted to engage the ends of the axle and to support the axle, as shown in Fig. 2. It follows from the above that the traction-wheel is adjustable vertically in its bearings with relation to the machine-frame, and hence the side of the latter on which the traction-wheel is located is adapted to be adjusted to any desired height above the ground.

Fast with the traction-wheel and revoluble therewith is a drive sprocket-wheel 63 of suitable size, which is connected to a normally loose sprocket-wheel 64, that is adapted for lateral adjustment on a counter-shaft 65, the latter being arranged in rear of the axle 54 and journaled in bearings 66 on the lower side of the trusses 2 4. A pair of sprocket-wheels 67 68 are fast on the counter-shaft 65, and on the outer side of wheel 67 is a clutch member 69, adapted to be engaged by a similar member 70 on the sprocket-wheel 64. A bell-crank lever 71 has its short arm 72 engaged with an annular groove 73 in the hub or projecting sleeve of the wheel 64, the function of the said bell-crank lever being to engage the wheel 64 with the shaft 65 by means of the clutch hereinbefore described, so as to lock said wheel to said shaft, and hence cause said counter-shaft to be rotated by the power communicated thereto from the traction-wheel. A hand-lever 74 of any suitable construction is mounted on the truss 2 within convenient reach of the seat 75 for the driver, and said hand-lever is connected to the bell-crank lever, hereinbefore described, by a rod 76. A segment-plate 77 and detent 78 of usual well-known form serve to secure the hand-lever 74 when adjusted.

A shaft 79 is journaled in bearings 80, secured near the angles of the angled bars 5 6 and in a bearing 81 on the truss 4. Fast to said shaft 79 are a pair of beveled gear-wheels 82, which engage the wheels 25 on shafts 22 23, which operate the endless conveyers. A sprocket-wheel 83, which is fast on the inner end of said shaft 79, is connected to the sprocket-wheel 68 by an endless sprocket-chain 84, and hence power is communicated to said shaft 79 when the loose sprocket-wheel 64 is locked to the counter-shaft 65, as will be understood.

A supporting-wheel 85, which is preferably of the same diameter as the traction-wheel 55, is on the side of the machine-frame opposite said traction-wheel and is mounted on a spindle 86, which projects from a lever 87, that is fulcrumed on the outer side of the truss 3, as at 88. Said lever 87 is adapted to be manually operated and is provided with a segment rack-plate 89, engaged by a spring-actuated detent 90 of usual form, which serves to secure said lever 87 at any desired adjustment. It will be understood that by this means the supporting-wheel 85 is adapted to be adjusted vertically with relation to the machine-frame.

I will have it understood that I do not desire to limit myself to the means herein shown and described for vertically adjusting the supporting and traction wheels in order to raise and lower the machine, as any suitable means may be employed to effect said adjustment.

I will now describe the cutter mechanism for cutting the cornstalks and the means for operating the same.

A cutter-bar 91 is disposed and guided in suitable ways, as at 92, on the front side of the cross-beam 7, said cutter-bar extending across the space between the two series of endless conveyers. On the said cutter-bar is secured a reciprocating cutter-plate 93, which may be either of the form here shown or of any other suitable construction and has cutting edges on opposite sides arranged at an angle to each other. This cutter-plate operates across the converging cutting edges of a pair of cutter-plates 94, which are secured rigidly in the angles formed between the inner sides of the truss-frames 10 and the cross-beams 7. Said cutter-plates have their oppositely-disposed cutting edges centrally arranged with relation to the space between the two series of endless conveyers. A shaft 95 is arranged longitudinally in the truss 2 and journaled in suitable bearings, as at 96. Said shaft has a beveled gear-wheel 97 at its rear end, which engages a similar gear-wheel 98, which is fast on the shaft 65, and is provided at its front end with a crank-wheel 99, which is connected to the cutter-bar 91 by means of a pitman 100.

A tongue or draft-pole 101 is pivotally connected, as at 102, to a stirrup-frame 103, which projects from the front end of the truss 2, the tongue being thus attached to the extreme inner front corner of the machine-frame. A plate or arm 104 projects from the upper side of the stirrup-frame, to which is fulcrumed a hand-lever 105, which is connected at its outer end to the tongue, near the rear end of the latter, by a link 106. The said hand-lever is secured at any adjustment by means of a spring-pressed detent 107, which engages a segment-rack 108, with which the arm or plate 104 is provided, and said hand-lever is disposed conveniently near the driver's seat 75, as shown. The outer end of the draft-pole or tongue being supported by the neck-yoke, connected to the collars of the team in the usual manner, the function of the hand-lever, as will be readily understood, is to adjust the machine-frame with relation to the tongue so that the shoes 20 at the front ends of the conveyer-frames may be adjusted to any desired height above the ground. The machine-frame and the operating mechanism thereon, as will be observed by reference to Figs. 1 and 2 of the drawings, are practically balanced on the supporting-wheels 55 85, and hence but little weight is applied to the collars of the draft-team. A draft-link 109 has its lower end pivotally connected to a hanger 110, which depends from the tongue. The upper end of the said link, which projects above the tongue, (said link operating in an elongated slot 111 in the tongue,) is connected to the front end of the truss 4 by a diagonally-disposed draft-bar 112, said bar being pivotally connected to said link, as at 113, and to said truss, as at 114. A doubletree 115 of usual or any preferred construction is attached to the draft-link, as at 116; and the function of said draft-link and said draft-bar is to apply power from the team to the central portion of the machine-frame, as well as to the outer corner thereof to which the tongue is attached, and thereby avoid any tendency to side draft, which might otherwise be developed by the machine.

A carrier 117 has its curved inner and outer walls 118 119 connected, respectively, to the rear portions of the conveying-frames, hereinbefore described. The said carrier is at an angle to said conveyer-frame and inclined downwardly and rearwardly, as shown, the bottom 120 of the said carrier being tilted at such an angle as to cause the butts of the cornstalks conveyed thereto and delivered thereon by the endless conveyers, hereinbefore described, to slide downward thereon by gravity. The curved outer wall 119 of the carrier is sustained by suitable brace-rods 119ª, which connect it with the truss 3. The inner wall 118 of the carrier is braced, as at 118ª or in any other suitable manner.

A shaft 121, which is disposed without the inner wall of the carrier and in proximity to the discharge end of the conveyers, is journaled in suitable bearings 122 and provided at its lower end with a beveled gear-wheel 123, which engages a similar wheel 124, fixed on the shaft 79, and hence rotary motion is communicated to said shaft 121 from said shaft 79. Near the lower end of the shaft 121 is a crank-arm 125 and at the upper end of said shaft is a crank-arm 126. The arm 125 operates in an opening 127 in the inner wall of the carrier and actuates a feed-plate 128, which is connected to said crank at one end and has its opposite end supported by a rocking link 129. Said rocking link is pivotally mounted on a bracket-arm 130, which projects from the truss 4. Rotatory reciprocatory motion is hence communicated to said feed-plate by the rotation of the shaft 121, and said feed-plate is provided on its inner side with a suitable number of projecting teeth or fingers 131, which extend over the inclined bottom of the carrier in the narrow space between the front portion of the side walls thereof, and said teeth or fingers serve to engage the cornstalks near the butts thereof as the feed-plate moves rearwardly, and feed the butts of the cornstalks to the carrier and prevent the cornstalks from choking in the throat or contracted space between the rear ends of the conveyer-frames. A feed-plate 132, which is somewhat longer than the feed-plate 128 and is likewise provided by the rearward-extending and inward-projecting teeth or fingers 133, is connected at its rear end to the crank-arm 126 at the upper end of shaft 121, and the front end of said feed-plate is supported and guided by a rocking link 134, which is pivoted to a suitable bracket 135, with which the brace-bar 18 is provided. Reciprocatory rotatory motion is communicated to the feed-plate 132 by said crank-arm and said link, and said feed-plate operates over the upper edge of the inner wall of the carrier in the contracted space or throat between the said walls of the carrier and serves by means of its fingers or teeth to engage the cornstalks at a height some distance above the butts thereof and to sweep the same rearward from the throat of the conveyer onto the carrier, as will be understood.

As the harvested corn moves rearward on the carrier the stalks are caught and retained in the carrier by a gate at the rear end thereof, which in the embodiment of my invention herein described and shown comprises a shaft 136 and sweep-arms (two or more) 137. A curved guide-arm 138 forms an extension of the rear upper corner of the outer wall of the carrier. Across the bottom of the carrier, near the discharge end thereof, is a stop 139, which extends across the bottom of the carrier and a few inches above the same and against which the butts of the cornstalks lodge as they are in transit over the inclined bottom of the carrier, the upper portions of the stalks falling upon and lodging against the gate or sweep-arms 137, and when the gate is supported in a position to close the space between the rear ends of the walls of the carrier, as shown in Figs. 1 and 2, the harvested corn is caused to accumulate in the carrier as the machine advances, as will be readily understood.

I will now describe my improved mechanism for operating the gate so as to move the sweep-arms through a circle to permit the discharge of the accumulated harvested corn from the carrier and return said gate or sweep-arms to the initial position thereof and lock the same against rotation until the carrier is again filled with harvested corn.

The shaft 136 is journaled near its upper end in a bearing-bracket 140, that projects from the inner wall of the carrier at the rear end thereof, and the lower end of said shaft is journaled in a bracket 141, bolted to the bar 9, which forms the rear side of the supporting-frame. An arm 142 is rigidly secured to the shaft 136, just above the bracket 141, and said detent-plate is provided with a lock-arm 143 and with an operating-cam 144, as shown in Figs. 11 and 12. A beveled gear-wheel 145 is fast to shaft 136, near the lower end thereof, and is engaged by a similar gear 146, which is fast on a horizontally-disposed shaft 147, said shaft being journaled in suitable bearings 148 149, with which the machine-frame is provided. A clutch member 150 is formed on the inner end of the hub or spindle of the gear 146. A sprocket-wheel 151 is loose on the shaft and adapted for lateral motion on said shaft and is provided with a clutch member 152 on the inner side thereof, which is adapted to engage the clutch member 150 of gear-wheel 146. A spring 153 bears against the outer side of sprocket-wheel 151, its function being to engage the clutch member 152 with the clutch member 150, and thereby lock the wheel 151 to the shaft 147, and hence cause rotary motion of said wheel 151 to be communicated to said shaft. An endless sprocket-chain 153ᵃ connects the sprocket-wheel 151 with the wheel 67 on the shaft 65. An endwise-movable yoke 154 engages the side of the sprocket-wheel 151 opposite the spring 153, and said yoke is guided in a way 155, formed in the bracket-arm 156, which carries the bearing 149, and the inner end of said yoke is disposed in the path of the cam 144 of detent-plate 142 and is adapted to be operated thereby as said plate rotates, so as to move said link toward the bearing 148, and thereby unclutch the sprocket-wheel 151 and permit it to rotate idly on the shaft 147, which it normally does. A bolt 157, which is disposed in the guideway 155, just below the yoke 154, is normally in the position shown in Fig. 9, with its inner end projecting beyond the proximate side of the bracket-arm 156 and in the path of and in engagement with the lock-arm 143 of the arm 142, and the latter is so disposed and secured on the shaft 136 that when its arm 143 is engaged by the said bolt 157 and said shaft 136 is thereby held against rotation the sweep or gate arms carried by said shaft will be in the normal position, (shown in Figs. 1 and 2,) closing the rear or discharge end of the carrier. A rocking link 158 is pivoted at its lower end to the bar 9, as at 159, and has its upper end loosely connected to the bolt 157, as at 160, and a rod 162 is connected to said link and is supported by and adapted to slide in a bracket-plate 163, which depends from the proximate upper portion of the truss 4. A spring 164 on said rod bears between said plate and a collar 165, fast on the rod, the function of said spring being to normally lock the bolt 157 with the detent-plate 142, and hence maintain the shaft 136 normally against rotation. A bell-crank lever 166 is connected to the rod 162 and is fulcrumed on a suitable support on the inner side of the truss 4, as at 167. An operating-cord 168 is attached to said bell-crank lever and extends forward, is guided over a sheave 169 on the front side of the machine-frame, thence passes outward through a guide 170 on the front side of the machine-frame, and is connected to a handle-ring 171, which is within easy reach of the driver.

It will be understood from the foregoing that when the carrier becomes filled with harvested corn and an appropriate place is reached for depositing the corn to be formed into a shock, the driver by drawing upon the cord 168 can operate the bell-crank lever 166, and thereby move the rod 162, link 158, and bolt 157 so as to cause the latter to move out of the path of and disengage the arm 142, thereby enabling the shaft 136 to be rotated. Simultaneously with the disengagement of the bolt 157 from the detent-plate the cam 144, carried by said plate, slips past and disengages the yoke 154, and hence the spring 153 instantly moves the clutch member 152 into engagement with the clutch member 150, as shown in Fig. 10, thereby locking the shaft 147 to the sprocket-wheel 151, and as the latter is always in operation when the harvesting-machine is at work, the gears 146 and 145 will cause the shaft 136 to make one complete revolution, thereby swinging the sweep or gate arm rearward from the carrier, so as to discharge the harvested corn therefrom, and as the said sweep or gate arms continue in their rotation they are returned by said shaft 136 to their initial position, at which time the cam 144 by reëngaging the yoke 154 will disconnect the shaft 147 from its operating sprocket-wheel 151 and the arm 143 of arm 142 will be again engaged by the spring-pressed locking-bolt 157, thus arresting the rotation of the shaft 136 and maintaining the gate-arm in the position shown in Figs. 1 and 2 and permitting a reaccumulation of harvested corn upon the carrier.

I do not desire to be limited to the precise construction and combination of devices hereinbefore described, as it is evident that modifications may be made therein without departing from the spirit of my invention.

Having thus described my invention, I claim—

1. In a corn-harvester, the combination with an inclined carrier and a discharge-gate at the lower side thereof having an operating-shaft, a power-shaft geared to said gate-operating shaft, a stop, means operated by the gate-operating shaft and coacting with said stop to lock the said gate-operating shaft and power-shaft against rotation, and manually-operated means to operate said stop and release said gate-operating and power shafts, and permit the rotation thereof, substantially as described.

2. In a corn-harvesting machine, the combination with stalk cutting and conveying mechanism, of a receiving-carrier onto which cut cornstalks are discharged by said cutting and conveying mechanisms, said receiving-carrier having a rearward descending bottom forming a chute down which the butts of the cut stalks slide, a stop disposed transversely on said chute or inclined bottom, to arrest the descent of the bottom of the stalks, a discharge-gate at the lower side of the said carrier and having an operating-shaft, a power-shaft geared to said gate-operating shaft, a stop, means, operated by the gate-operating shaft and coacting with said stop to lock the said gate-operating shaft and power-shaft against rotation, and manually-operated means to operate said stop and release said gate-operating and power shafts and permit the rotation thereof, substantially as described.

3. In a corn-harvester, the combination with an inclined carrier and a discharge-gate at the lower side thereof and having an operating-shaft, an arm and cam on said shaft, a power-shaft geared to said gate-operating shaft and having a clutch, for the purpose set forth, operated by the cam, and a locking-bolt to engage the arm, substantially as described.

4. In a corn-harvesting machine, the conveyer-frames, the inclined endless conveyer-chains, the sprocket-wheels at the front ends of the conveyer-frames rotated by said conveyer-chains, said sprocket-wheels having cranks, the gathering-arms engaged by said cranks near their front ends, guides for the rear portions of said gathering-arms, and gathering-fingers carried by said gathering-arms, substantially as described.

5. In a corn-harvesting machine, the conveyer-frames, the inclined endless conveyer-chains, the sprocket-wheels at the front ends of the conveyer-frames rotated by said conveyer-chains, said sprocket-wheels having cranks, the gathering-arms engaged by said cranks near their front ends, guides for the rear portions of said gathering-arms and gathering-fingers pivoted to and carried by said gathering-arms and tension-springs bearing against said pivoted gathering-fingers.

6. In a corn-harvesting machine, the forward-projecting conveyer-frames the inclined endless conveyer-chains, the guide-wheels for said chains at the lower, front ends of the said frames, the actuating-shafts having the actuating-wheels engaging the rear portions of said chains, gathering-fingers engaged by cranks carried by the guide-wheels at the front ends of the conveyer-frames, and guides for said gathering-fingers, all combined and adapted to operate, substantially as described.

7. In a corn-harvesting machine, the rearward-converging conveyer-frames arranged on opposite sides of a cutting mechanism and adapted to straddle a row of corn, endless conveyers in said conveyer-frames, actuating-shafts at the rear ends of said frames for said conveyers, the shaft 79 geared to said actuating-shafts, a downward-inclined carrier in rear of the conveyer-frames, a shaft disposed to one side of the contracted pass between the conveyer-frames and carrier, and geared to the shaft 79, and having cranks at its upper end and near its lower end, feed-plates connected to said cranks and adapted to operate in the said contracted pass, for the purpose set forth, and rocking links supporting the free ends of said feed-plates, substantially as described.

In testimony that I claim the foregoing as my own I have hereto affixed my signature in the presence of two witnesses.

WILLIAM H. ROE.

Witnesses:
W. S. WILSON,
HENRY HOLLYDAY, Jr.